US006912582B2

(12) United States Patent
Guo et al.

(10) Patent No.: US 6,912,582 B2
(45) Date of Patent: Jun. 28, 2005

(54) SERVICE ROUTING AND WEB INTEGRATION IN A DISTRIBUTED MULTI-SITE USER AUTHENTICATION SYSTEM

(75) Inventors: Wei-Quiang Michael Guo, Bellevue, WA (US); Baskaran Dharmarajan, Mountain View, CA (US); Ryan W. Battle, Tampa, FL (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 09/823,324

(22) Filed: Mar. 30, 2001

(65) Prior Publication Data

US 2002/0143964 A1 Oct. 3, 2002

(51) Int. Cl.[7] ............................................... G06F 15/16
(52) U.S. Cl. ....................... 709/229; 709/203; 709/219; 709/249
(58) Field of Search ................................ 709/203, 249, 709/219, 229

(56) References Cited

U.S. PATENT DOCUMENTS

| 5,959,985 | A | * | 9/1999 | Freen et al. ................. 370/351 |
| 5,999,603 | A | * | 12/1999 | Lo et al. ................. 379/127.01 |
| 6,055,236 | A | * | 4/2000 | Nessett et al. .............. 370/389 |
| 6,321,262 | B1 | * | 11/2001 | Springer ..................... 709/223 |
| 6,578,199 | B1 | * | 6/2003 | Tsou et al. .................. 717/178 |

OTHER PUBLICATIONS

Peterson, The Profile Naming Service, ACM Transactions on Computer Systems, vol. 6 No. 4, pp. 341–364, Nov. 1988, USA.
Joseph et al., The Case for Services over Cascaded Networks, pp. 2–10, USA.
Hauzeur, A Model for Naming, Addressing, and Routing, ACM Transactions on Office Information Systems, vol. 4 No. 4, pp. 293–311, Oct. 1986, Belgium.
Lewandowski, Frameworks for Component–Based Client/Server Computing, ACM Computing Surveys, vol. 30 No. 1, pp 3–27, Mar. 1998, USA.

* cited by examiner

*Primary Examiner*—Saleh Najjar
*Assistant Examiner*—Emmanuel Coffy
(74) *Attorney, Agent, or Firm*—Senniger Powers (57) ABSTRACT

A computerized method and system for routing between network servers. A central database coupled to a central server on a data communication network stores information for identifying locations of a plurality of network servers on the network. Each network server provides at least one service via the network. The central server receives a request from the user for a selected service including a carry through keyword for controlling routing of the user to the selected service. The central server retrieves location information from the central database to identify the location of the network server providing the selected service and attaches the carry through keyword to the retrieved location information. The central server then routes the user with the carry through keyword to the network server, which directs the user to the selected service based on the carry through keyword.

32 Claims, 5 Drawing Sheets

SERVICE ROUTING AND WEB INTEGRATION IN A DISTRIBUTED MULTI-SITE USER AUTHENTICATION SYSTEM

TECHNICAL FIELD

The invention relates generally to service routing and, particularly, to automatically routing a user from one web site to an affiliated site with a multi-site user authentication system for the user to obtain a desired web service.

BACKGROUND OF THE INVENTION

The recent growth in popularity of the Internet has significantly increased the number of Internet users and the number of Internet sites (also referred to as "web sites"). Web sites may provide various types of information to users, offer products or services for sale, and provide games and other forms of entertainment. Many web sites require users to "register" by providing personal information before the web server grants access to the site. This registration information may include the user's name, account number, address, telephone number, e-mail address, computer platform, age, gender, or hobbies. The registration information collected by the web site may be necessary to complete transactions (such as commercial or financial transactions). Additionally, information can be collected which allows the web site operator to learn about the visitors to the site to better target its future marketing activities or adjust the information provided on the web site. The collected information may also be used to allow the web site to contact the user directly (e.g., via e-mail) in the future to announce, for example, special promotions, new products, or new features of the web site.

When registering with a web site for the first time, the web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If a user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the web site. Thus, the user must enter the requested registration information before they can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Computer-based services, such as Web portals, instant messaging, e-mail, and the like, often require routing the user to one or more collaborating affiliate web sites to obtain desired services. Each site may require user authentication as described above. Typically, web sites expose "shortcut" links to common web services. For example, a web site may provide a clickable link to "send an e-mail to your friend" when a user who subscribes to a partnering e-mail service visits the particular site. Unfortunately, conventional systems do not effectively route a user from one web site to another for performing web services. Although shortcut links to web services are known, the use of a conventional link requires that the uniform resource locator (URL) for each web service be known and maintained by the source web site (i.e., where the link is displayed). Moreover, a conventional link is limited to a single web service. For these reasons, improved routing is desired to permit a web site to provide a clickable link for the user's e-mail or other web service even though the source web site does not know the URL of the destination site providing the service. Such a system is further desired for providing effective, automatic routing even though the source web site does not know either the user's login status, such as whether the user is signed into the destination service, or the specific application programming interface (API) for the service. Such a system is particularly desirable with a multi-site user authentication system where the site that provides a particular service for the user may depend on the user's domain (e.g., e-mail at hotmail.com vs. msn.com).

SUMMARY OF THE INVENTION

The invention meets the above needs and overcomes the deficiencies of the prior art by providing improved service routing. According to one aspect of the invention, a multi-site user authentication system provides a federated environment in which locations of web services are centrally looked up. The look up service can be part of the user sign-in handshake as implemented in such an authentication system. The invention also provides automatic routing to a particular page at the web service site without additional navigation at the site. Moreover, service routing as described herein is economically feasible and commercially practical.

Briefly described, a computerized method embodying aspects of the invention performs routing between network servers coupled to a data communication network. The method includes storing information in a central database coupled to a central server for identifying locations of a plurality of network servers on the data communications network. The central server is also coupled to the data communication network. The network servers each provide at least one service via the data communication network and the method includes receiving a request from the user for a selected service to be provided by one of the network servers. The central server receives the request, which includes a carry through keyword for controlling routing of the user to the selected service. The method further includes retrieving location information from the central database to identify the location of the network server providing the selected service, attaching the carry through keyword to the retrieved location information, and routing the user to the network server providing the selected service. The network server then directs the user to the selected service based on the carry through keyword.

In another embodiment, a computerized system routes a user between network servers coupled to a data communication network. The system includes a central server coupled to the data communication network and a central database coupled to the central server. The central database stores information for identifying locations of a plurality of network servers on the data communications network, each providing at least one service via the data communication network. The central server receives a request from the user for a selected service to be provided by one of the network servers. In this embodiment, the request includes a carry through keyword for controlling routing of the user to the selected service. The central server retrieves location information from the central database to identify the location of the network server providing the selected service and attaches the carry through keyword to the retrieved location information. The central server then routes the user with the carry through keyword to the network server providing the selected service. In turn, the network server directs the user to the selected service based on the carry through keyword.

In yet another embodiment, a computer readable medium stores a data structure embodying aspects of the invention. The data structure has a first field containing location information identifying locations of a plurality of network servers on a data communications network. The network servers each provide at least one service via the data communication network and maintain the location information in the first field. A second field contains keyword information relating the location information to the services provided by the network servers. In response to a request from a user for a selected service to be provided by one of the network servers, a central server coupled with the data structure retrieves the location information from the first field to identify the location of the network server providing the selected service. The central server also attaches the keyword information to the retrieved location information for routing the user to the selected service based on the keyword information.

Alternatively, the invention may comprise various other methods and apparatuses.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Referring now to the drawings, the present invention relates to cross-internet collaboration between web sites as part of a distributed, multi-site user authentication system (e.g., Microsoft® Passport sign-in service). A portal web site, for instance, offers computer-based services, such as e-mail, instant messaging, calendar, and portfolio tracking, and routes the user to affiliated web sites for performing the desired services. A system according to a preferred embodiment of the invention routes a user from one web site to another web site for performing these services (also referred to as "web services") using a clickable link. This is possible even without the source web site (i.e., the site where the link is displayed) having knowledge of the uniform resource locator (URL) of the destination site providing the service. Moreover, the source web site need not know whether the user is signed into the service or what the specific application programming interface (API) is for the service. This is particularly useful with a multi-site user authentication system where the destination site that provides a particular service for the user may depend on the user's domain (e.g., e-mail at hotmail.com vs. msn.com).

Figure 1:
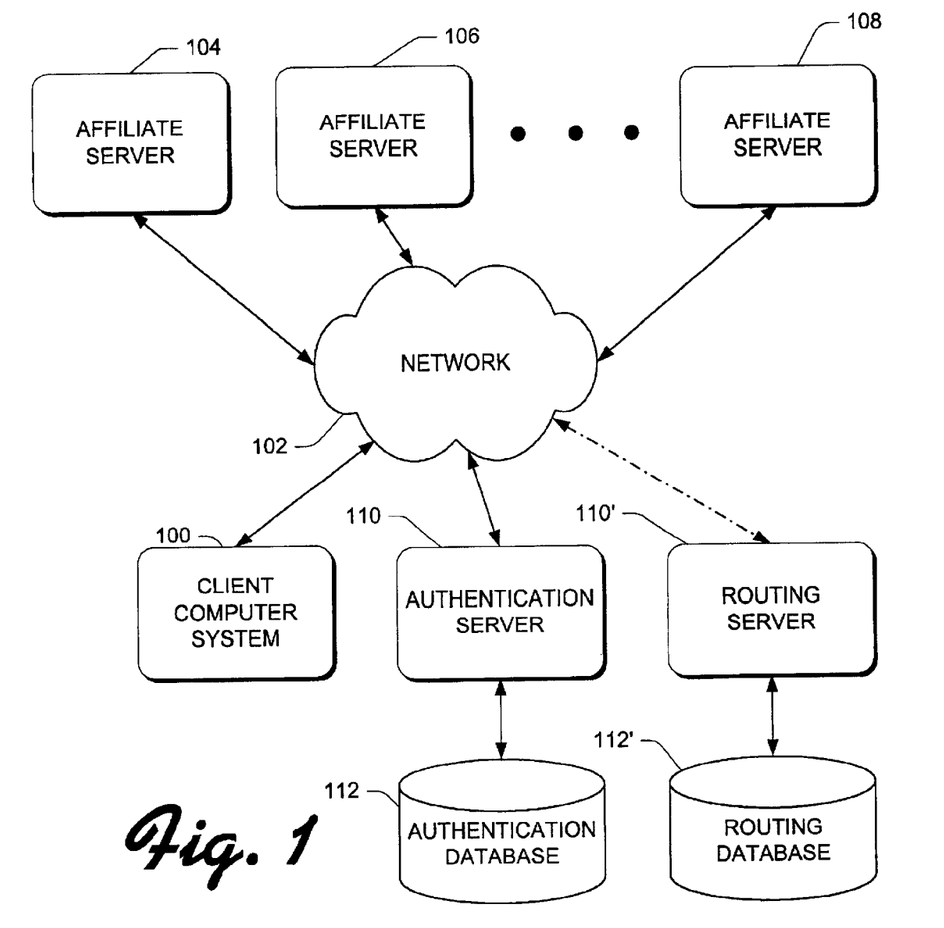
FIG. 1 is a block diagram illustrating an exemplary network environment in which a preferred embodiment of the present invention is utilized.

FIG. 1 illustrates an exemplary network environment in which the present invention is utilized. A client computer system 100 is coupled to a data communication network 102. In this example, the network 102 is the Internet (or the World Wide Web). However, the teachings of the present invention can be applied to any data communication network. Multiple affiliate servers 104, 106, and 108 are also coupled to network 102. In turn, the client computer system 100 can access the affiliate servers 104, 106, and 108 via network 102. Affiliate servers 104, 106, and 108 are also referred to as "web servers" and "network servers." An authentication server 110 coupled to network 102 allows communication between itself and client computer system 100 and web servers 104, 106, and 108. Although referred to as an "authentication server," authentication server 110 is also a web server capable of interacting with web browsers and other web servers. In this example, data is communicated between authentication server 110, client computer system 100, and web servers 104, 106, 108 using the hypertext transfer protocol (HTTP), a protocol commonly used on the Internet to exchange information.

An authentication database 112 is coupled to authentication server 110. The authentication database 112 contains information necessary to authenticate users and also identifies which elements of the user profile information should be provided to a particular affiliate server when the user accesses the affiliate server. Although the authentication database 112 is shown separately from authentication server 110, in other embodiments of the invention, authentication database 112 is contained within authentication server 110. It is also contemplated that the routing mechanism described herein need not be coupled with the authentication mechanism while still achieving the stated functionality. In this regard, FIG. 1 illustrates an optional routing server 110' and routing database 112' separated from authentication server 110 and authentication database 112. In a preferred embodiment of the invention, authentication server 110 and authentication database 112 constitute a central server and a central database, respectively.

The authentication process, as described below, authenticates a user of client computer 100 seeking access to an affiliate server 104, 106, or 108. Authentication server 110 authenticates the user of client computer 100 by requesting authenticating information, such as the user's login ID and password. If the user is successfully authenticated, then authentication server 110 routes client computer 100 to the appropriate affiliate server for performing a desired service for the user. Additional details regarding the routing are provided below.

As part of the user authentication process, authentication server 110 may provide certain user profile information to the affiliate server, such as the user's e-mail address, user preferences, and the type of Internet browser installed on client computer 100. This user profile information is associated with the user's login ID so that each time the user logs into an affiliate server, the associated user profile information is available to provide to the affiliate server. This user profile allows the user to enter the information once and use that information during subsequent logins to new affiliate servers.

In a preferred embodiment, an "affiliate server" is a web server that has "registered" or otherwise established a relationship or affiliation with authentication server 110. Each affiliate server 104, 106, and 108 includes a code sequence (not shown) that allows the affiliate server to communicate with authentication server 110 when a user (who is also registered with the authentication server) requests access to the affiliate server. Additional details regarding the authentication process and the interaction between client computer 100, affiliate servers 104, 106, 108, and authentication server 110 are provided below.

Figure 2:
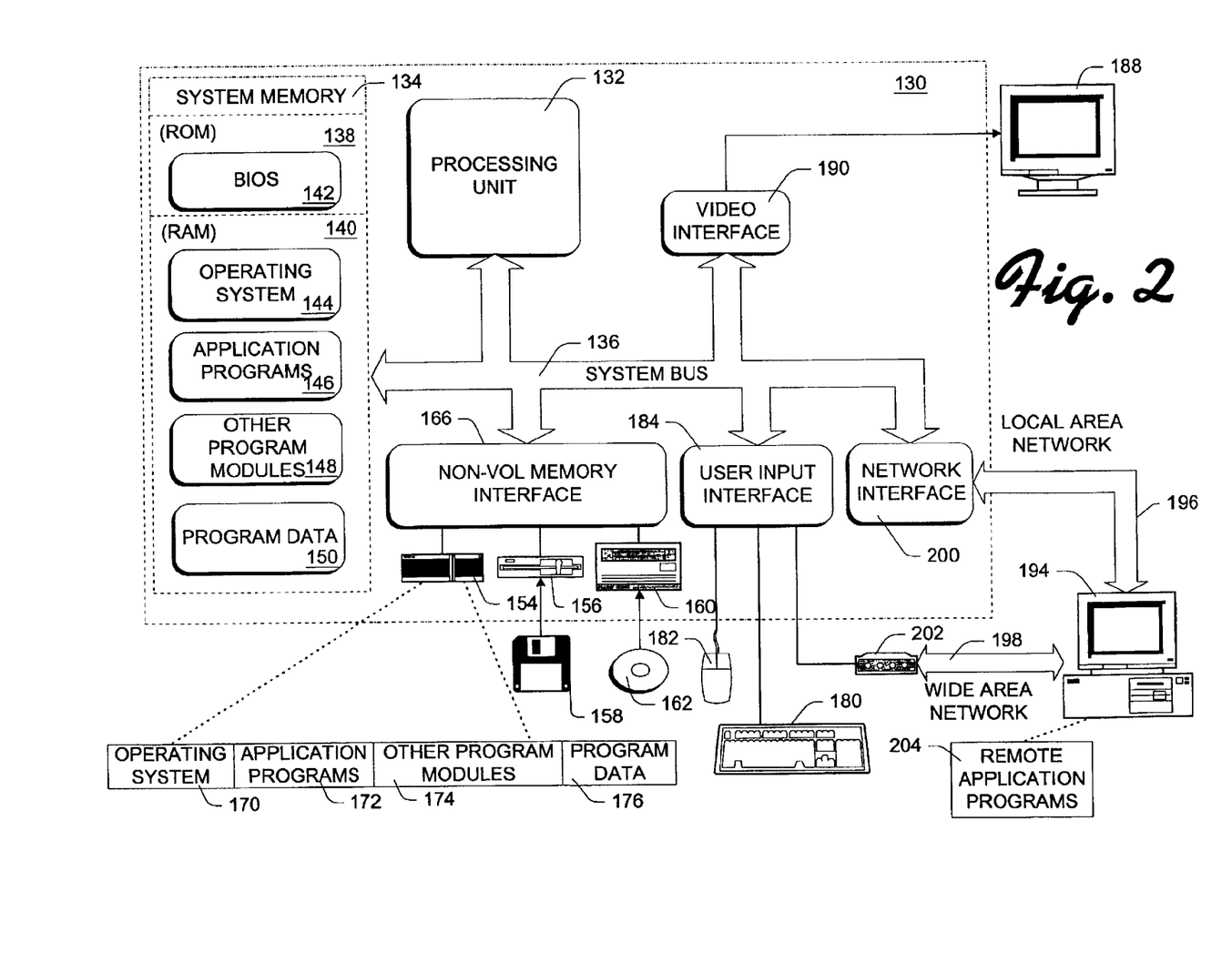
FIG. 2 is a block diagram illustrating components of a computer for use in the environment of FIG. 1.

FIG. 2 shows one example of a general purpose computing device in the form of a computer 130. In a preferred embodiment of the invention, a computer such as the computer 130 is suitable for use in client computer system 100, authentication server 110, or any of the affiliate servers 104, 106, or 108.

Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media. and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 2 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 2, provide storage of computer readable instructions, data structures, program modules and other data for the computer 130. In FIG. 2, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 2 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Prior to executing the authentication process described below, both the user of client computer system 100 and the operator(s) of affiliate servers 104, 106, 108 "register" with authentication server 110. This registration is a one-time process that provides necessary information to the authentication server. The user of client computer system 100 registers with authentication server 110 by providing, for example, the user's name, mailing address, and e-mail address, and/or other information about the user or client computer system 100. As part of the user registration process, the user is assigned (or selects) a login ID, which is a common login ID, used to access any affiliate server (e.g., server 104, 106, 108). The login ID may also be referred to herein as a "user name" or "login name". Additionally, the user selects a password associated with the login ID that is used for authentication purposes. After registering and logging into the authentication server, the user can visit any affiliate server (i.e., affiliate servers that are also registered with the same authentication server) without requiring any additional authentication and without re-entering user information that is already contained in the associated user profile.

The operator(s) of affiliate servers 104, 106, 108 register with authentication server 110 by providing information about the affiliate server (e.g., server name and Internet address). Additionally, each affiliate server 104, 106, 108 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. Refreshing the authentication information refers to the process of having the user re-enter the password to be certain that the appropriate user is still operating client computer system 100. This periodic refreshing of authentication information is useful if the user leaves his or her computer system without logging out of authentication server 110, thereby allowing another individual to access affiliate servers 104, 106, 108 using the login ID of the previous user. If a user requests access to one of the affiliate servers 104, 106, 108 after the maximum allowed time has lapsed, then authentication server 110 re-authenticates (i.e., refreshes) the user. Thus, although there is a central authentication server 110, affiliate servers 104, 106, 108 can establish their own authentication requirements to be enforced by the authentication server. After registering with authentication server 110, affiliate servers 104, 106, 108 can use the authentication server to authenticate any user that has also registered with the authentication server.

Figure 3:
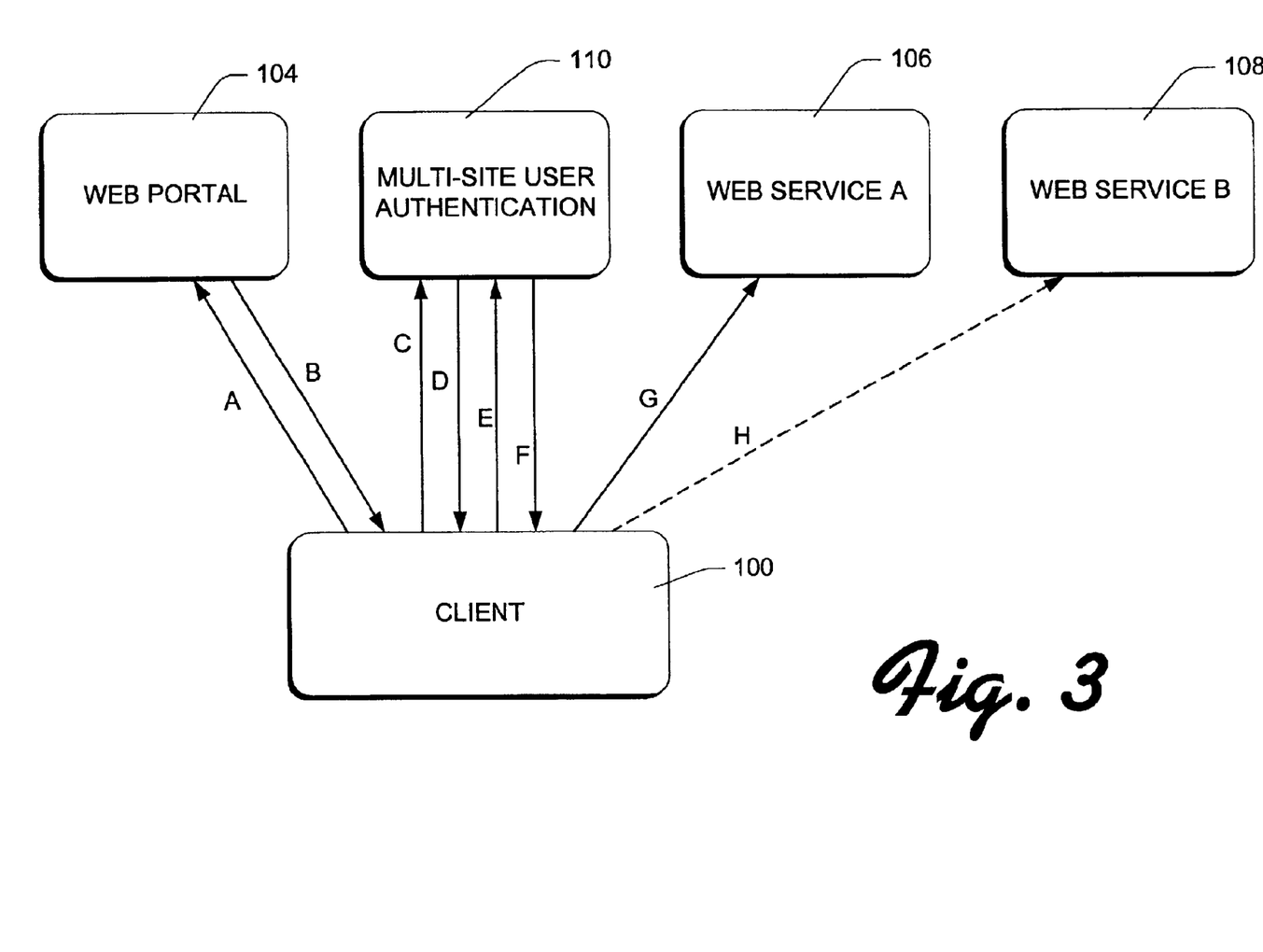
FIGS. 3 and 4 are exemplary flow diagrams illustrating the interaction between a client computer system, affiliate servers and an authentication server of FIG. 1 when a user of the client computer system seeks access to the affiliate server for obtaining a desired service.

FIG. 3 illustrates the interaction between client computer system 100, affiliate servers 104, 106, and 108, and authentication server 110 when a user of the client computer system seeks access to one of the affiliate servers. The illustrated example describes the situation in which the user of client computer system 100 has not yet logged into affiliate server 106 and has not yet been authenticated by authentication server 110. The lines in FIG. 3 labeled "A" through "H" represent the flow of information or activities during the authentication and routing processes. The arrows on the lines indicate the direction of the process flow. The label "A" represents the beginning of the processes and the label "H" represents the end of the processes.

Figure 4:
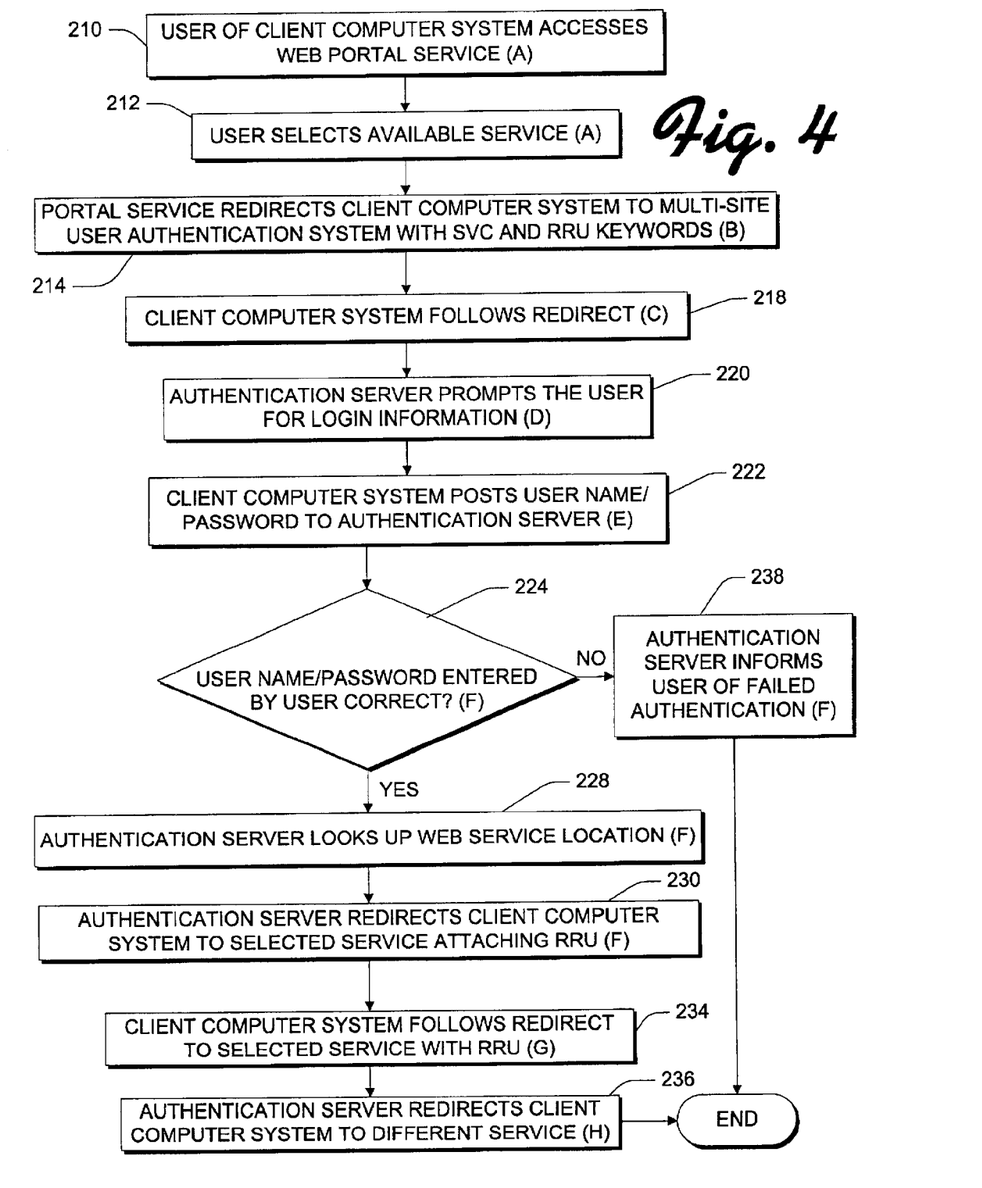

In the exemplary process flow of FIGS. 3 and 4, the user of client computer system 100 begins at 210 by accessing a portal service (e.g., MSN® network of Internet services at http://www.msn.com) available via affiliate server 104. At 212, the user selects one of the services available through the portal. For example, the user may select an e-mail service by clicking on a link to Hotmail® e-mail service (or another e-mail service) available through the portal. (See A). A web service typically has many features. Among other things, the Hotmail® e-mail service mentioned above allows the user to compose a message, display his or her inbox or address book, or set various preferences. The service routing originating application may request the destination service to present a particular feature (e.g., compose e-mail or inbox) as part of the routing process. If an option for "compose e-mail" is available, past experience may indicate that the user prefers showing a Hotmail® e-mail service compose page so the user can immediately compose e-mail without additional navigation at the Hotmail® e-mail service web site. The use of one or more keywords enables this routing. As described below, this particular example is implemented by using a "carry through" keyword rru to enable the specific routing.

Proceeding to 214, the portal service at affiliate server 104 redirects client computer system 100 to the multi-site user authentication system provided by authentication server 110 (e.g., Microsoft® Passport sign-in service). According to the invention, affiliate server 104 redirects client computer system 100 with one or more "service routing request" keywords in addition to the carry through keyword. In this example, the service routing request keyword svc=email and the carry through keyword rru=query parameter. (See B). In this instance, authentication database 112 stores information for identifying the locations of a plurality of affiliate servers 104, 106, 108. When authentication server 110 receives a request from the user for the selected service, the request includes a carry through keyword for controlling routing of the user to the selected service.

The client computer system 100 follows the redirect command issued by the portal at 218. (See C). At 220, authentication server 110 prompts the user to enter login information (e.g., e-mail user name and password) for verification with the information stored in authentication database 112. (See D). In a preferred embodiment of the invention, client computer system 100 communicates confidential information, such as the login ID and password, to authentication server 110 using a secure protocol (e.g., secure sockets layer (SSL)). Various other secure protocols or encryption mechanisms can be used to communicate confidential information between authentication server 110 and client computer system 100.

The client computer system 100 posts the user's credentials (e.g., user name/password) to authentication server 110 at 222. (See E). The authentication server 110 then validates the user name/password provided by the user at 226 and, if successful, looks up the desired web service location at 228 before redirecting client computer system 100 to the appropriate service (e.g., Hotmail® e-mail service), attaching the rru carry through parameter, at 230. (See F). In other words, authentication server 110 retrieves the appropriate location information from authentication database 112 to identify the location of server 104, 106, or 108 providing the selected service. The authentication server 110 then attaches the carry through keyword to the retrieved location information to create a new URL. A key question addressed by the present invention is where to find the user's web service, such as e-mail, calendar, etc. Inasmuch as this question is answered after the user identification is known, the solution is a very well suited for use in conjunction with a multi-site user authentication system.

In operation, a preferred embodiment of the present invention redirects the user to the authentication system to look up the location of a selected web service for a given user (e.g., based on the user's domain). The user's member name (as part of the multi-site user authentication system) identifies the user, the service routing request keyword identifies the category of desired web service, and the carry through keyword controls the specific routing process. Authentication server 110 preferably uses the service routing request to look up the appropriate location for the selected service for the user, based on the user's domain (e.g., bobsmith@hotmail.com). Proceeding to 234, client computer system 100 follows the redirect to the selected service with rru=query parameter. (See G). Authentication server 110 instructs the selected service which page to display with the carry through keyword (or carries through another command for the service web site).

In a preferred embodiment, the invention is at the heart of cross web service integration in a federated environment. The invention provides the ability to centrally look up the location of a web service for a given user. As an example, selecting the e-mail link directs the user to the authentication system (e.g., Microsoft® Passport sign-in service) with a service routing request for e-mail and a carry through keyword to the desired service (e.g., compose new e-mail at Hotmail® e-mail service). After retrieving the necessary data, authentication server 110 automatically sends the user to the final destination (i.e., the Hotmail® e-mail web service) together with the carry through keyword and displays Hotmail® e-mail service's page for composing new messages.

The authentication database 112 provides a central medium for storing routing configuration information. Additional destination services can be dynamically added/changed at the multi-site user authentication system without additional operational procedures at the affiliate sites. The added benefit is that the affiliate sites can change their respective URLs without maintaining the previous URL for performing an HTTP 302 redirect, for example. Affiliate servers 104, 106, 108 require less maintenance while end users enjoy improved performance.

At 236, in the alternative, authentication server 110 redirects client computer system 100 to affiliate server 108 where the user selected a different service (e.g., a calendar Web service instead of Hotmail® e-mail service). (See H). Returning to 226, if the user-entered information is not correct (i.e., it does not match the information stored in authentication database 112), then at 238 authentication server 110 generates and communicates a web page to the user indicating the login ID and password combination was not valid. In the event of user name and/or password failure, the svc and rru parameters may still be carried for a certain number of tries according to a preferred embodiment of the invention. Security concerns, for example, may limit the number of times the user can attempt to login. As a specific example, if the user attempts to access the options page of his or her e-mail service (http:/login.hotmail.passport.com/cgibin/login?rru=options&svc=mail), the user will be routed to the login page with svc=mail and rru=options values carried through. In this example, even if the user forgets his or her password and must try a number of times before successfully entering the password, the server keeps the svc and rru values for a number of login attempts and eventually directs the user to the desired options page.

The exemplary process flow diagrams of FIGS. 3 and 4 illustrate the general idea of service routing by carrying through a parameter, which facilitates cross web integration. Although it is contemplated that aspects of the process flow may vary, the operations labeled G and H are generally fundamental to the various scenarios.

Figure 5:
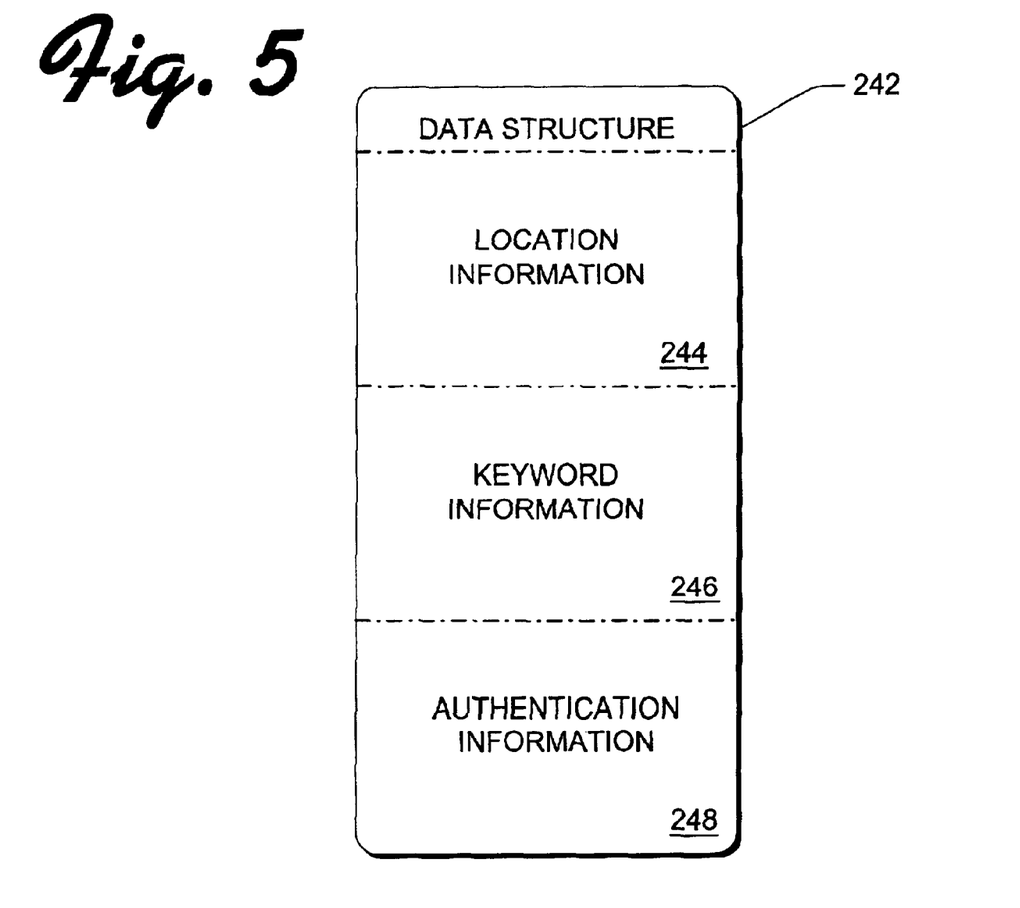
FIG. 5 is a block diagram illustrating an exemplary data structure stored on an authentication database of FIG. 1.

Referring now to FIG. 5, a computer readable medium, namely authentication database 112, has a data structure 242 stored thereon embodying aspects of the invention. The data structure 242 preferably includes a first field 244, a second field 246, and a third field 248. In this embodiment, the first field 244 contains location information identifying locations of network servers 104, 106, 108. As described above, network servers 104, 106, 108 preferably maintain this location information in first field 244. The second field 246 contains keyword information that relates the location information to the services provided by network servers 104, 106, 108. In this instance, the central server, i.e., authentication server 110, uses the keyword information for routing the user to the selected service. Authentication server 110 retrieves the location information from the first field 244 to identify the location of the network server providing the selected service as a function of the keyword information in the second field 246. As described above, authentication server 110 attaches a carry through keyword to the retrieved location information for routing the user to the selected service based on the keyword information. The third field 248 preferably contains authentication information for comparison to login information from the user.

The following provides an example of routing configuration information stored in authentication database 112 as expressed in an extensible markup language (XML) format:

<domain name=hotmail.com>
email=http://www.hotmail.com
calendar=http://calendar.hotmail.com
membercare=http://memberservices.hotmail.passport.com
</domain>
<domain name=msn.com>
email=http://www.msn.hotmail.com
calendar=http://calendar.msn.hotmail.com
membercare=http://memberservices.msn.passport.com
</domain>
<service name=portfolio>
<location href=http://investor.msn.com/portfolio>
<location href=http://www.some-financial-web.com>
</service>

Service routing also applies to non-e-mail sign-ins and dictates what user profile data gets sent to the destination web service. If a user has multiple credentials, for instance, the user can sign-in with alternative login names (e.g., a phone number) and still request access to an end user service such as e-mail. As an example, a cell phone with a microbrowser can authenticate the user through the use of a phone number and personal identification number (PIN) before the user is routed to his or her e-mail service. In this routing process, user data (such as user name) are looked up based on a need of the given service and is sent to the destination service. Moreover, service routing is contemplated as a separate service. Its integration into a user authentication handshake has the performance benefit of fewer round trips between the client and the server.

In an alternative embodiment, it is to be understood that a particular web service may not be unique to a domain. For example, there may be several financial web sites that offer a portfolio tracking service. If these sites are user domain agnostic, the routing service of authentication server 110 will simply return a list of choices for the user to make a final decision. This decision can be tracked in a user profile to automate the routing the next time the user logs on and requests the service. In other words, one embodiment of the present invention includes per-user routing to allow the user to select one of the services and store the information in the central database 112 associated with authentication system 110 (e.g., the user chooses which location to use for a portfolio tracking service). This is an alternative to the service request being dependent on the user's domain.

In another embodiment, multiple contending web services may exist for the same user domain. In this case, authentication server 110 returns a list for the user to make a decision and, as before, the decision can be tracked in user profile. In other words, multiple destinations are available for the same domain (e.g., user chooses to check e-mail at home or at work). Again, this provides an alternative to the service request being dependent on the user's domain. This is also related to yet another preferred embodiment of the present invention in which a plurality of service keywords are used. For example, a Web site may be an aggregation portal (e.g., mobile.msn.com on a cell phone). When the user accesses the aggregation portal, he or she is really accessing a number of services. The aggregation portal preferably requests that multiple service locations be looked up in a single transaction and then does not need to ask for location look-up again.

In yet another embodiment, the present invention includes the use of a general keyword carry through. This advantageously allows arbitrary names and numbers of keywords to be designated for carrying through (as an alternative to the specific keyword described above).

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computerized method of routing between network servers coupled to a data communication network, said method comprising:

storing information in a central database for identifying locations of a plurality of network servers that provide at least one service via the data communication network, said central database being coupled to a central server, said central server being coupled to the data communication network;

receiving a request from a user for a selected service to be provided by one of the network servers, said request being received at the central server and including a carry through keyword for controlling routing of the user to the selected service;

retrieving location information from the central database to identify the location of the network server providing the selected service;

attaching the carry through keyword to the retrieved location information;

routing the user to the network server providing the selected service, said user being directed to the selected service based on the carry through keyword;

identifying the selected service with a service routing request keyword included in the service request received at the central server; and transferring an alternative user name of the user with the retrieved location information as a function of the service routing request keyword.

2. The method of claim 1 further comprising storing authentication information in the central database for authenticating the user.

3. The method of claim 2 further comprising receiving a request at the central server to authenticate the user when the user requests the selected service and authenticating the user by determining whether the user was already authenticated and, if the user was not already authenticated, then retrieving login information from the user for comparison to authentication information stored in the central database.

4. The method of claim 3 wherein the user is routed to the network server providing the selected service after the user is authenticated by the central server.

5. The method of claim 1 wherein the carry through keyword references content associated with the selected service provided by the network server.

6. The method of claim 1 further comprising storing user-specific information in the central database for identifying the user and wherein the carry through keyword is based on the user-specific information.

7. The method of claim 6 wherein the user-specific information includes user and domain names for the user.

8. The method of claim 1 wherein at least on of the network servers is a portal for providing the user with a gateway to the services provided by the network servers, and further comprising routing the user from the portal to the central server with the carry through keyword for controlling routing of the user and with the service routing request keyword for identifying the selected service when the user requests the selected service.

9. The method of claim 1 further comprising identifying the user with a domain name and wherein the location information is retrieved from the central database as a function of the domain name for the user.

10. The method of claim 9 further comprising identifying a plurality of providers of the selected service, permitting the user to select one of the identified plurality of providers for receiving the selected service, and routing the user to the network server of the selected one of the identified plurality of providers of the selected service.

11. The method of claim 10 wherein the identified plurality of providers of the selected service are based on the domain name for the user.

12. The method of claim 10 further comprising storing a user profile in the central database, said user profile including user preference information with respect to the identified plurality of providers of the selected service.

13. The method of claim 1 further comprising identifying a plurality of providers of the selected service with a service routing request keyword included in the service request received at the central server.

14. The method of claim 1 wherein storing information in the central database for identifying the locations of the network servers includes registering the network servers with the central server.

15. The method of claim 1 further comprising operating a browser program configured to permit the user to communicate on the data communication network.

16. The method of claim 1 wherein the network servers are web servers and the data communication network is the Internet.

17. The method of claim 1 wherein the method is performed by the central server.

18. A computer-readable medium having computer-executable instructions for performing the method of claim 1.

19. A computerized system far routing between network servers coupled to a data communication network, said system comprising:

a central server coupled to the data communication network;

a central database storing information for identifying locations of a plurality of network servers that provide at least one service via the data communication network, said central database being coupled to a central server;

said central server receiving a request from a user for a selected service to be provided by one of the network servers, said request including a carry through keyword for controlling routing of the user to the selected service, said selected service being identified by a service routing request keyword included in the request received at the central server;

said central server retrieving location information from the central database to identify the location of the network server providing the selected service and attaching the carry through keyword to the retrieved location information, said central server transferring the retrieved location information with an alternative user name of the user to the network server providing the selected service as a function of the service routing request keyword; and said central server routing the user with the carry through keyword to the network server providing the selected service, said user being directed to the selected service based on the carry through keyword.

20. The system of claim 19 Wherein the central database further stores authentication information in the central database for authenticating the user.

21. The system of claim 20 wherein the central server comprises an authentication server receiving a request to authenticate the user when the user requests the selected service and authenticating the user by determining whether the user was already authenticated and, if the user was not already authenticated, then retrieving login information from the user for comparison to authentication information stored in the central database.

22. The system of claim 21 wherein the user is routed to the network server providing the selected service after the user is authenticated by the authentication server.

23. The system of claim 19 wherein the carry through keyword references content associated with the selected service provided by the network server.

24. The system of claim 19 wherein the central database further stores user-specific information for identifying the user and wherein the carry through keyword is based on the user-specific information.

25. The system of claim 24 wherein the user-specific information includes user and domain names for the user.

26. The system of claim 19 wherein at least one of the network servers is a portal for providing the user with a gateway to the services provided by the network servers and wherein the user is routed from the portal to the central server with the carry through keyword for controlling routing of the user and with the service routing request keyword for identifying the selected service when the user requests the selected service.

27. The system of claim 19 wherein the user is identified by a domain name and wherein the location information is retrieved from the central database as a function of the domain name far the user.

28. The system of claim 27 wherein a plurality of the network servers provide the selected service and the user is permitted to select one of the network servers for receiving the selected service and wherein the central server routes the user to the selected network server.

29. The system of claim 28 wherein the plurality of network servers providing the selected service is based on the domain name for the user.

30. The system of claim 28 wherein the central database further stores a user profile, said user profile including user preference information with respect to the plurality of network servers providing the selected service.

31. The system of claim 19 wherein a service routing request keyword included in the service request received at the central server identifies a plurality of the network servers providing the selected service.

32. The system of claim 19 wherein the network servers are web servers and the data communication network is the Internet.

* * * * *